United States Patent
Kemmer et al.

(10) Patent No.: US 10,171,213 B2
(45) Date of Patent: Jan. 1, 2019

(54) COMMUNICATION DEVICE AND METHOD FOR PERFORMING RADIO COMMUNICATION

(71) Applicant: Intel IP Corporation, Santa Clara, CA (US)

(72) Inventors: Bernd Kemmer, Eichenau (DE); Anuj Sethi, Nuremberg (DE); Rasmus Jensen, Gistrup (DK); Hans Friedrich, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 11 days.

(21) Appl. No.: 15/355,448

(22) Filed: Nov. 18, 2016

(65) Prior Publication Data
US 2017/0180093 A1 Jun. 22, 2017

(30) Foreign Application Priority Data
Dec. 21, 2015 (DE) .......... 10 2015 122 432

(51) Int. Cl.
| | |
|---|---|
| *H04L 5/00* | (2006.01) |
| *H04W 8/18* | (2009.01) |
| *H04W 48/18* | (2009.01) |
| *H04W 72/04* | (2009.01) |
| *H04W 84/02* | (2009.01) |
| *H04W 84/04* | (2009.01) |
| *H04W 84/08* | (2009.01) |

(52) U.S. Cl.
CPC .......... *H04L 5/0048* (2013.01); *H04W 8/18* (2013.01); *H04W 48/18* (2013.01); *H04W 72/0406* (2013.01); *H04W 84/02* (2013.01); *H04W 84/042* (2013.01); *H04W 84/08* (2013.01)

(58) Field of Classification Search
CPC ... H04W 8/18; H04W 48/18; H04W 72/0406; H04L 5/0048
See application file for complete search history.

(56) References Cited

U.S. PATENT DOCUMENTS 8,768,350 B2 * 7/2014 Hagens ............... H04L 65/1053
455/433

FOREIGN PATENT DOCUMENTS

| DE | 602005005313 | 4/2009 |
|---|---|---|
| WO | 2011068557 A1 | 6/2011 |

OTHER PUBLICATIONS

German Examination Report for application DE 102015122432.1, dated Oct. 6, 2016, 6 pages.

* cited by examiner

*Primary Examiner* — Ronald B Abelson
(74) *Attorney, Agent, or Firm* — Lowenstein Sandler LLP (57) ABSTRACT

A communication device is provided that includes a radio frequency circuit configured to receive and transmit radio frequency signals. The communication device further includes a processing circuit configured to process network information. The communication device further includes a memory circuit configured to transmit a first network information to the processing circuit. The communication device further includes a subscriber identity module configured to transmit a second network information to the processing circuit. The processing circuit is configured to select a first network based on the first network information and to register a communication device information at a second network based on the second network information.

24 Claims, 6 Drawing Sheets

FIG 6

COMMUNICATION DEVICE AND METHOD FOR PERFORMING RADIO COMMUNICATION

RELATED APPLICATION

This application claims priority to German Patent Application No. 10 2015 122 432.1, filed Dec. 21, 2015, the contents of which are hereby incorporated by reference herein.

TECHNICAL FIELD

The present disclosure relates to communication devices and methods for performing radio communication.

BACKGROUND

In a scenario, a wireless communication device that includes a subscriber identity module may read data of a subscriber identity module card of the subscriber identity module, select a mobile radio communication network based on information of the subscriber identity module card and register at the selected mobile radio communication network. It may be desirable to provide a communication device and a method that may select and register at the mobile radio communication network fast and reliable.

SUMMARY

A communication device is provided that includes a radio frequency circuit configured to receive and transmit radio frequency signals. The communication device further includes a processing circuit configured to process network information. The communication device further includes a memory circuit configured to transmit a first network information to the processing circuit. The communication device further includes a subscriber identity module configured to transmit a second network information to the processing circuit. The processing circuit is configured to select a first network based on the first network information and to register a communication device information at a second network based on the second network information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

A communication device may read data of a subscriber identity module card and establish a connection with a Public Land Mobile Network after the communication device is switched on. Reading the data of the subscriber identity module card may contribute considerably to a time duration from switching the communication device on until a registration at the Public Land Mobile Network. The communication device may be provided with a non-volatile memory circuit. Further, the communication device may be configured to store network selection information in the memory circuit exemplarily in a shutdown procedure. Moreover, the communication device may be configured to read the stored information from the memory circuit to select a matching Public Land Mobile Network faster than reading the selection information from the subscriber identity module.

Various aspects of this disclosure provide a communication device that may include a radio frequency circuit configured to receive and transmit radio frequency signals. Further, the communication device may include a processing circuit configured to process network information. Moreover, the communication device may include a memory circuit configured to transmit a first network information to the processing circuit. Further, the communication device may include a subscriber identity module configured to transmit a second network information to the processing circuit. Moreover, the processing circuit may be configured to select a first network based on the first network information and to register a communication device information at a second network based on the second network information. Thus, the communication device may register at a network fast and efficiently. The connection may be a radio frequency connection. The first network and the second network may be mobile radio communication networks. The communication device information may be an information identifying the communication device. Further, the processing circuit may include software associated with a Non-Access Stratum (NAS). The NAS may be configured to determine selection criteria of a selection of a network.

Various aspects of this disclosure provide a communication device that may, include a radio frequency circuit configured to receive an available network signal and to transmit radio frequency signals. Further, the communication device may include a processing circuit configured to process network information. Moreover, the communication device may include a memory circuit configured to transmit a first network information to the processing circuit. Further, the communication device may include a subscriber identity module configured to transmit a second network information to the processing circuit. Moreover, the processing circuit may be configured to determine a selection list based on an available network information of the available network signal, to select a first network based on the first network information and the available network information and to register a communication device information at a second network based on the second network information and the available network information. Thus, the communication device may register at a network fast and efficiently.

In an example, the memory circuit may be a non-volatile memory circuit. Thus, the first network information may be quickly available after the communication device is switched on.

In an example, the memory circuit may be configured to transmit the first network information to the processing circuit in a connection initialization phase in which the processing circuit may be configured to establish a radio frequency connection. Thus, the communication device may have a short initialization time after the communication device is switched on.

In an example, the processing circuit may be configured to verify if the second network information may be consistent with the first network information. Thus, the communication device may be reliable.

In an example, the processing circuit may be configured to verify if the second network information is identical to the first network information.

In an example, the processing circuit may be configured to verify if the second network information is consistent with the selection of the first network. Thus, the processing circuit may be reliable. The processing circuit may be configured to determine if the first network is selected in case the selection would have been based on the second network information.

In an example, the second network may be the first network if at least one of the second network information is consistent with the first network information or the second network information is consistent with the selection of the first network. Thus, the communication device may be efficient in registering at the selected network.

In an example, the processing circuit may be configured to select the second network if at least one of the second network information is inconsistent with the first network information or the second network information may be inconsistent with the first network. Thus, the communication device may be reliable.

In an example, the second network may be different from the first network.

In an example, the first network and the second network may be Public Land Mobile Networks (PLMN). The PLMN may be configured in accordance with a mobile radio communication technology.

In an example, the first network information may be at least one of a group of network information of a mobile radio communication technology consisting of International Mobile Subscriber Identity, Card Type of the subscriber identity module, Acting Home Public Land Mobile Network, Broadcast Control Channels, Network Parameters, Access Control Class, Last Registered Public Land Mobile Network Selection Indication, Equivalent Home Public Land Mobile Network, Home Public Land Mobile Network Selector with Access Technology, Location Information, Packet Switched Location Information, Evolved Packet System Location Information and Equivalent Public Land Mobile Networks. Thus, the memory circuit may transmit specific information so that the communication device may be efficient and fast. The network information of the group of network information may be associated with subscriber identity module cards.

In an example, the processing circuit may be configured to transmit a current network information to the memory circuit and the subscriber identity module. Thus, the communication device may be configured to provide the same network information to the memory circuit and the subscriber identity module.

In an example, the processing circuit may be configured to transmit the current network information to the memory circuit and the subscriber identity module in a shutdown procedure of the communication device. Thus, the processing circuit may be configured to process current data in an initialization procedure after the communication device is switched on.

In an example, the subscriber identity module may include a subscriber identity module card.

In an example, the second network information may include at least one information of the subscriber identity module card. Thus, the communication device may comply with regulations of a radio communication technology.

In an example, the available network signal may include a first broadcast signal of the first network and a second broadcast signal of the second network.

Furthermore, a method for performing radio communication is provided that may include receiving and transmitting radio frequency signals. Moreover, the method may include transmitting a first network information of a memory circuit to a processing circuit. Further, the method may include transmitting a second network information of a subscriber identity module to the processing circuit. Moreover, the method may include selecting a first network based on the first network information. Moreover, the method may include registering a communication device information at a second network based on the second network information.

Furthermore, a method for performing radio communication is provided that may include receiving an available network signal and transmitting radio frequency signals. Further, the method may include transmitting a first network information of a memory circuit to a processing circuit. Moreover, the method may include transmitting a second network information of a subscriber identity module to the processing circuit. Further, the method may include determining a selection list based on an available network information of the available network signal. Moreover, the method may include selecting a first network based on the first network information and the available network information. Further, the method may include registering a communication device information at a second network based on the second network information and the available network information.

It should be noted that aspects described in the context of the previous examples may be analogously valid for the above provided methods.

Figure 1:
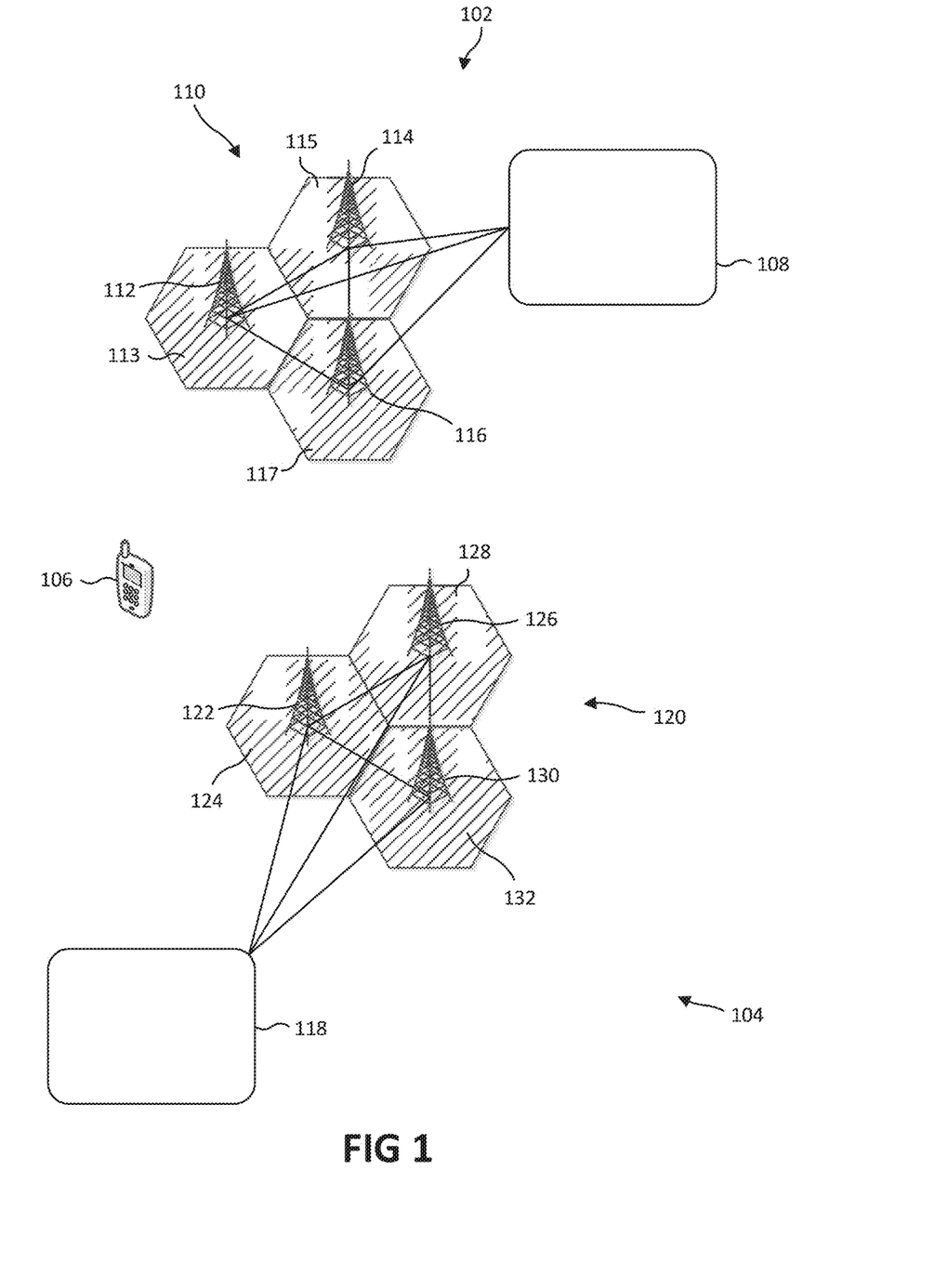
FIG. 1 shows a schematic drawing of a first mobile radio communication network, a second mobile radio communication network and a mobile wireless device according to an example.

FIG. 1 shows a schematic drawing of a first mobile radio communication network 102, a second mobile radio communication network 104 and a mobile wireless device 106 according to an example. The first mobile radio communication network 102 may be a first Public Land Mobile Network (PLMN) and may have a first core network 108 and a first access network 110. The first access network 110 may include a first base station 112 of a first cell 113, a second base station 114 of a second cell 115 and a third base station 116 of a third cell 117. The second mobile radio communication network 104 may be a second PLMN and may have a second core network 118 and a second access network 120. The second access network 120 may include a fourth base station 122 of a fourth cell 124, a fifth base station 126 of a fifth cell 128 and a sixth base station 130 of a sixth cell 132. Further, the mobile wireless device 106 may be in a connection initialization phase in which the mobile wireless device 106 may be configured to select a mobile radio communication network from the first mobile radio communication network 102 and the second mobile radio communication network 104. The mobile radio communication networks may be configured to transmit broadcast signals including information of the mobile radio communication networks, respectively.

Figure 2:
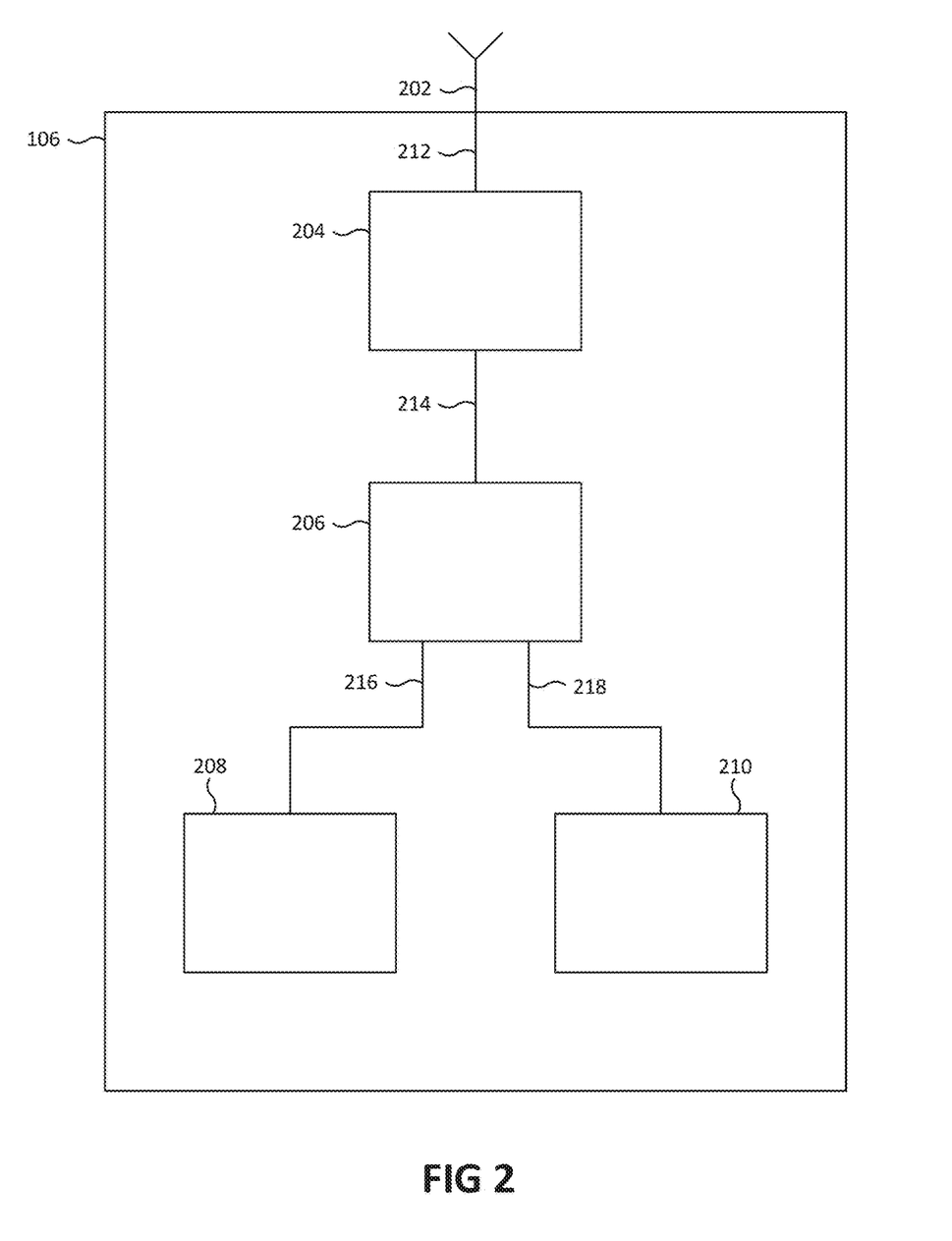
FIG. 2 shows a schematic drawing of the mobile wireless device.

FIG. 2 shows a schematic drawing of the mobile wireless device 106. The mobile wireless device 106 may include an antenna 202, a radio frequency circuit 204, a processing circuit 206, a subscriber identity module 208 and a memory circuit 210. The antenna 202 may be connected with the radio frequency circuit 204 via a first connection 212. The radio frequency circuit 204 may be connected with the processing circuit 206 via a second connection 214. The processing circuit 206 may be connected with the subscriber identity module 208 via a third connection 216 and with the memory circuit 210 via a fourth connection 218.

Further, the antenna 202 may be configured to transmit radio frequency signals to the mobile radio communication networks 102 and 104 and to receive radio frequency signals from the mobile radio communication networks 102 and 104. Moreover, the antenna 202 may be configured to transmit the received radio frequency signals to the radio frequency circuit 204. The radio frequency circuit 204 may be configured to process the radio frequency signals including a digitization, equalization, demodulation and decoding.

Moreover, the processing circuit 206 may be configured to receive and to transmit processing data to the radio frequency circuit 204. The processing data may include data to generate the radio frequency signals and to apply the radio frequency signals to the antenna 202 for transmission. Further, the processing circuit 206 may be configured to apply data to be stored in the memory circuit 210 and on a subscriber identity module card of the subscriber identity module 208. The memory circuit 210 may be a non-volatile memory circuit and may be configured to store data and to transmit stored data to the processing circuit 206. Further, the subscriber identity module 208 may be configured to store data on the subscriber identity module card and to transmit the stored data to the processing circuit 206.

The processing circuit 206 may be configured to select the mobile radio communication network from the first mobile radio communication network 102 and the second mobile radio communication network 104 based on parameter sets. Further, the processing circuit 206 may be configured to register at the selected mobile radio communication network.

Figure 3:
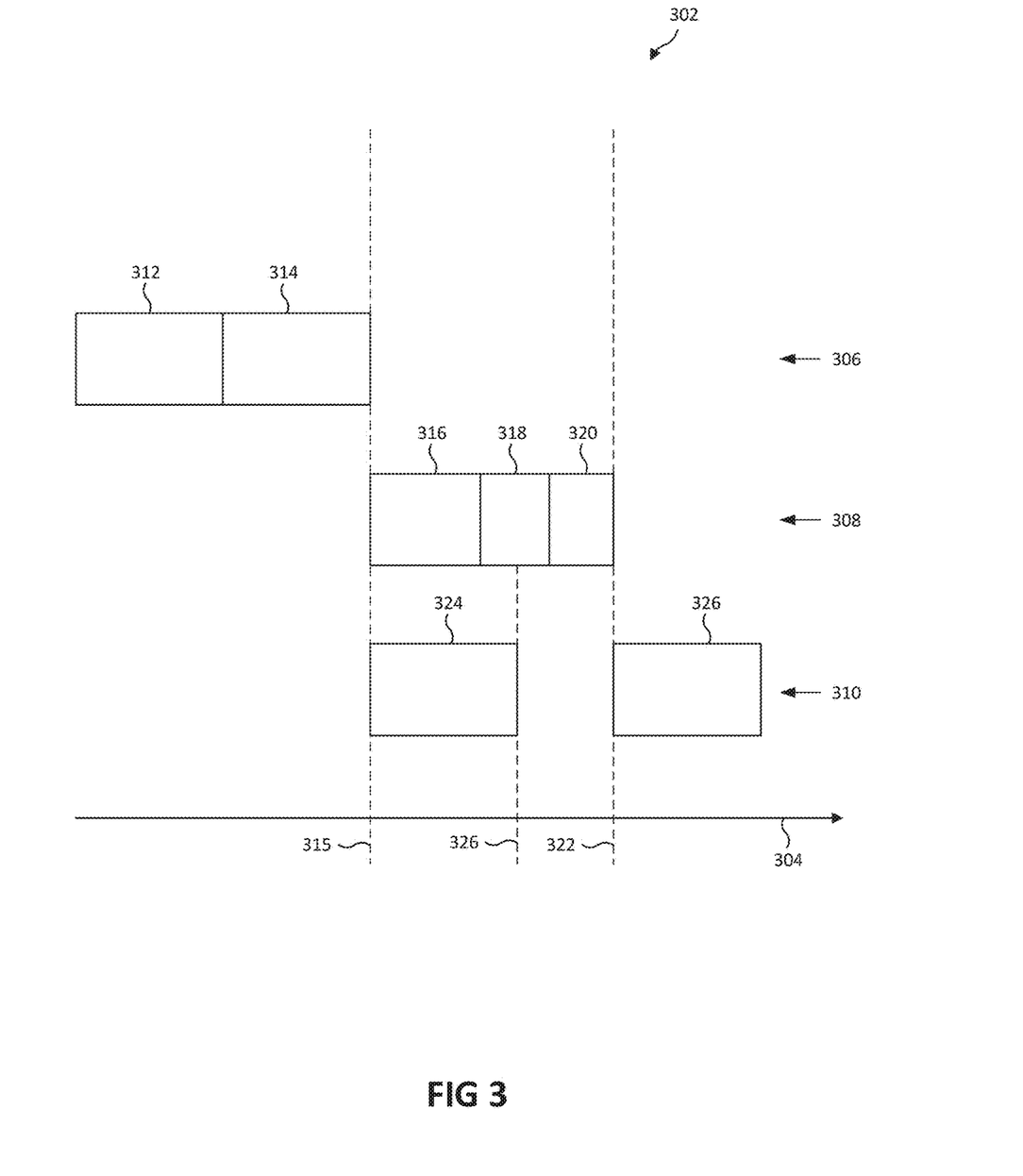
FIG. 3 shows a schematic diagram of an initialization process of the mobile wireless device.

FIG. 3 shows a schematic diagram 302 of an initialization process of the mobile wireless device 106. The diagram 302 may have an axis 304 that may indicate a time flow, a first portion 306 that may show system processes, a second portion 308 that may show data reading processes of the subscriber identity module card and a third portion 310 that may show processes of the processing circuit 206.

In an initialization phase of the mobile wireless device 106, for example after the mobile wireless device 106 is switched on, the processing circuit 206 may, in 312, be configured to boot an operating system of the mobile wireless device 106 and to initialize the operating system, the radio frequency circuit 204, the subscriber identity module 208 and the memory circuit 210 in 314. The initialization of the operating system, the radio frequency circuit 204, the subscriber identity module 208 and the memory circuit 210 may be finished at a first time 315.

Further, in the initialization phase of the mobile wireless device 106, the subscriber identity module 208 may be configured to initialize a User Services Identity Module Application Process (USIMAP) in 316, to read a first set of parameters from the subscriber identity module card in 318, to read a second set of parameters from the subscriber identity module card in 320 and to transmit the parameter sets to the processing circuit 206. The first parameter set and the second parameter set may be parameter sets related to a selection of a mobile radio communication network and the registration of the selected mobile radio communication network, respectively. The reading of the second parameter set from the subscriber identity module card and the transmission to the processing circuit 206 may be finished at a second time 322.

The processing circuit 206 may be configured to obtain, in 324, a stored network information from the memory circuit 210 starting at the first time 315. The stored network information may be a first initialization parameter set related to the selection of the mobile radio communication network of the processing circuit 206. The first initialization parameter set may include parameters of a group of elementary file parameters associated with subscriber identity modules consisting of International Mobile Subscriber Identity, Card Type of the subscriber identity module, Acting Home Public Land Mobile Network, Broadcast Control Channels, Network Parameters, Access Control Class, Last Registered Public Land Mobile Network Selection Indication, Equivalent Home Public Land Mobile Network, Home Public Land Mobile Network Selector with Access Technology, Location Information, Packet Switched Location Information, Evolved Packet System Location Information and Equivalent Public Land Mobile Networks. Moreover, the stored network information may be a first network information and the first parameter set and the second parameter set may be a second network information.

Further, the processing circuit 206 may be configured to select, in 324, the mobile radio communication network based on the first network information. The selection of the mobile radio communication network may be finished at a third time 326. In an example, the third time 326 may be a time before the second time 322. Further, in an example, the third time 326 may be a time after the second time 322.

Moreover, the processing circuit 206 may be configured to verify, after obtaining the parameter sets from the subscriber identity module 208, if the selected mobile radio communication network is consistent with a selection of the mobile radio communication network based on the first parameter set and the second parameter set obtained from the subscriber identity module 208.

If the selection of the mobile radio communication network is consistent with a selection of the mobile radio communication network based on the first parameter set the processing circuit 206 may be configured to register, in 326, at the selected mobile radio communication network starting at the second time 322.

If the selection of the mobile radio communication network is inconsistent with a selection of the mobile radio communication network based on the first parameter set the processing circuit 206 may be configured to select the mobile radio communication network based on the first parameter set and to register at the mobile radio communication network based on the second parameter set.

As an alternative to the verification if the selected mobile radio communication network is consistent with a selection of the mobile radio communication network based on the first parameter set obtained from the subscriber identity module 208, the processing circuit 206 may be configured to verify if the first network information is consistent with the second network information so that data of the first network information that may be relevant in the selection of the mobile radio communication network may be identical to corresponding data of the second network information.

Further, in a shutdown procedure of the mobile wireless device 106, the processing circuit 206 may be configured to apply a current network information that may include information of a current connection with a mobile radio communication network to be stored in the memory circuit and on the subscriber identity module card.

Figure 4:
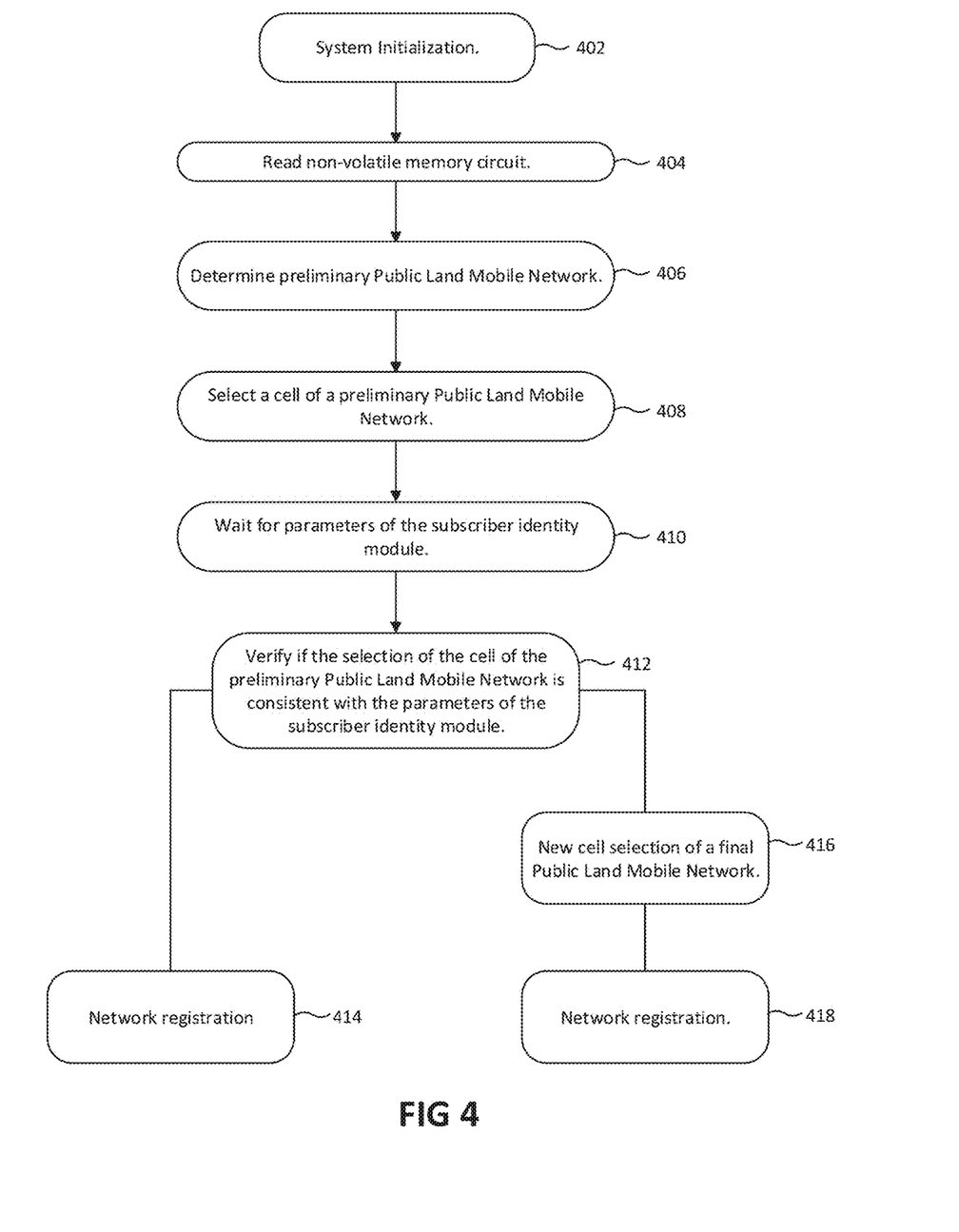
FIG. 4 shows a flow diagram of the initialization phase of the mobile wireless device.

FIG. 4 shows a flow diagram of the initialization phase of the mobile wireless device 106. In 402, the processing circuit may be configured to initialize systems of the mobile wireless device 106.

In 404, the memory circuit 210 may be configured to transmit the first network information to the processing circuit 206.

In 406, the processing circuit 206 configured to determine a preliminary Public Land Mobile Network based on the first network information.

In 408, the processing circuit 206 may be configured to select a cell of a preliminary Public Land Mobile Network.

In 410, the processing circuit 206 may be configured to wait until the subscriber identity module may transmit a second information stored on the subscriber identity module card to the processing circuit 206.

In 412, processing circuit 206 may be configured to verify if the selection of the preliminary Public Land Mobile Network is consistent with the second network information.

In 414, the processing circuit 206 may be configured to register at the selected preliminary Public Land Mobile Network if the selection of the preliminary Public Land Mobile Network is consistent with the second network information.

In 416, the processing circuit 206 may be configured to execute a new cell selection based on the second network information if the selection of the preliminary Public Land Mobile Network is inconsistent with the second network information.

In 418, the processing circuit 206 may be configured to register at a final Public Land Mobile Network that may include the selected new cell.

Figure 5:
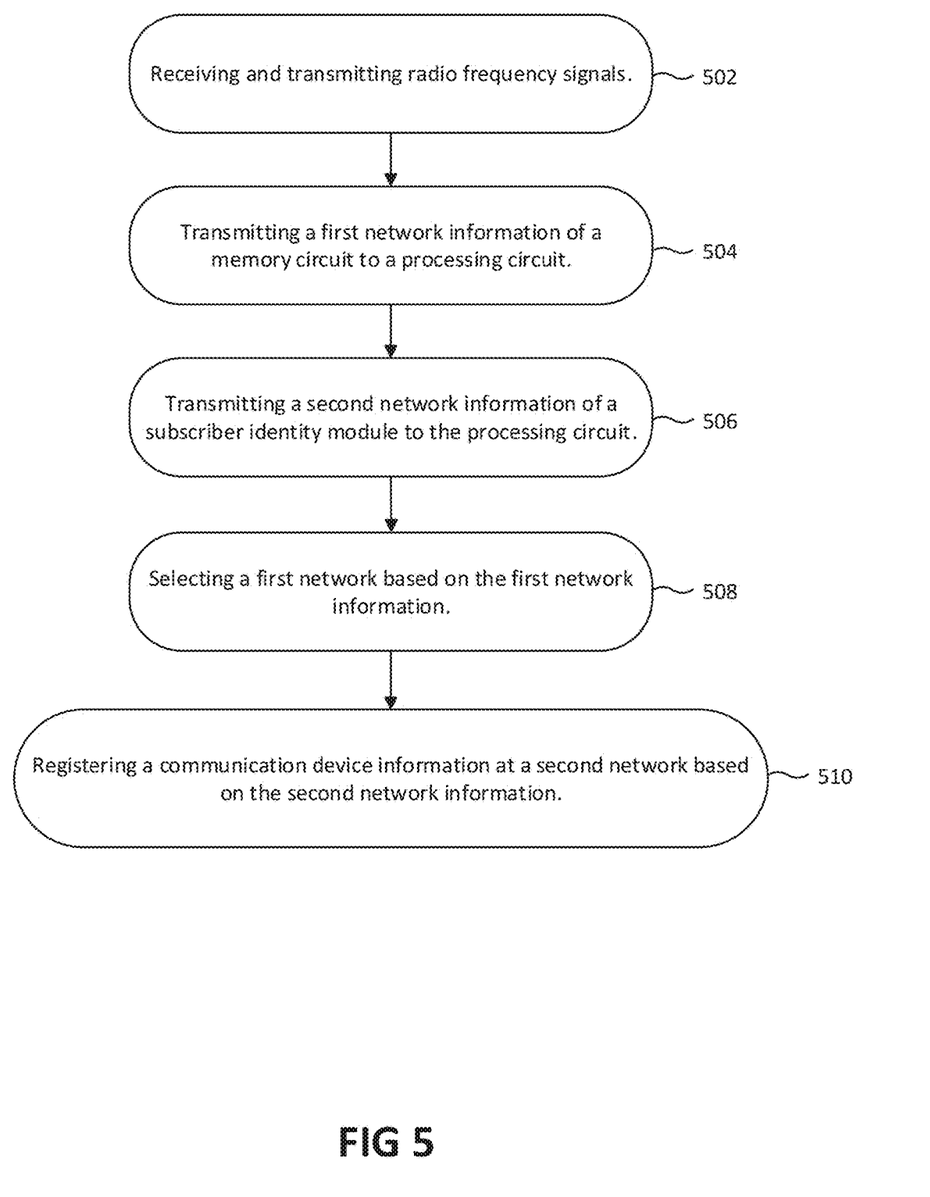
FIG. 5 shows a method for performing radio communication according to an example.

FIG. 5 shows a method for performing radio communication according to an example. The method may include, in 502, receiving and transmitting radio frequency signals.

Moreover, the method may include, in 504, transmitting a first network information of a memory circuit to a processing circuit.

Further, the method may include, in 506, transmitting a second network information of a subscriber identity module to the processing circuit.

Moreover, the method may include, in 508, selecting a first network based on the first network information.

Further, the method may include, in 510, registering a communication device information at a second network based on the second network information.

Figure 6:
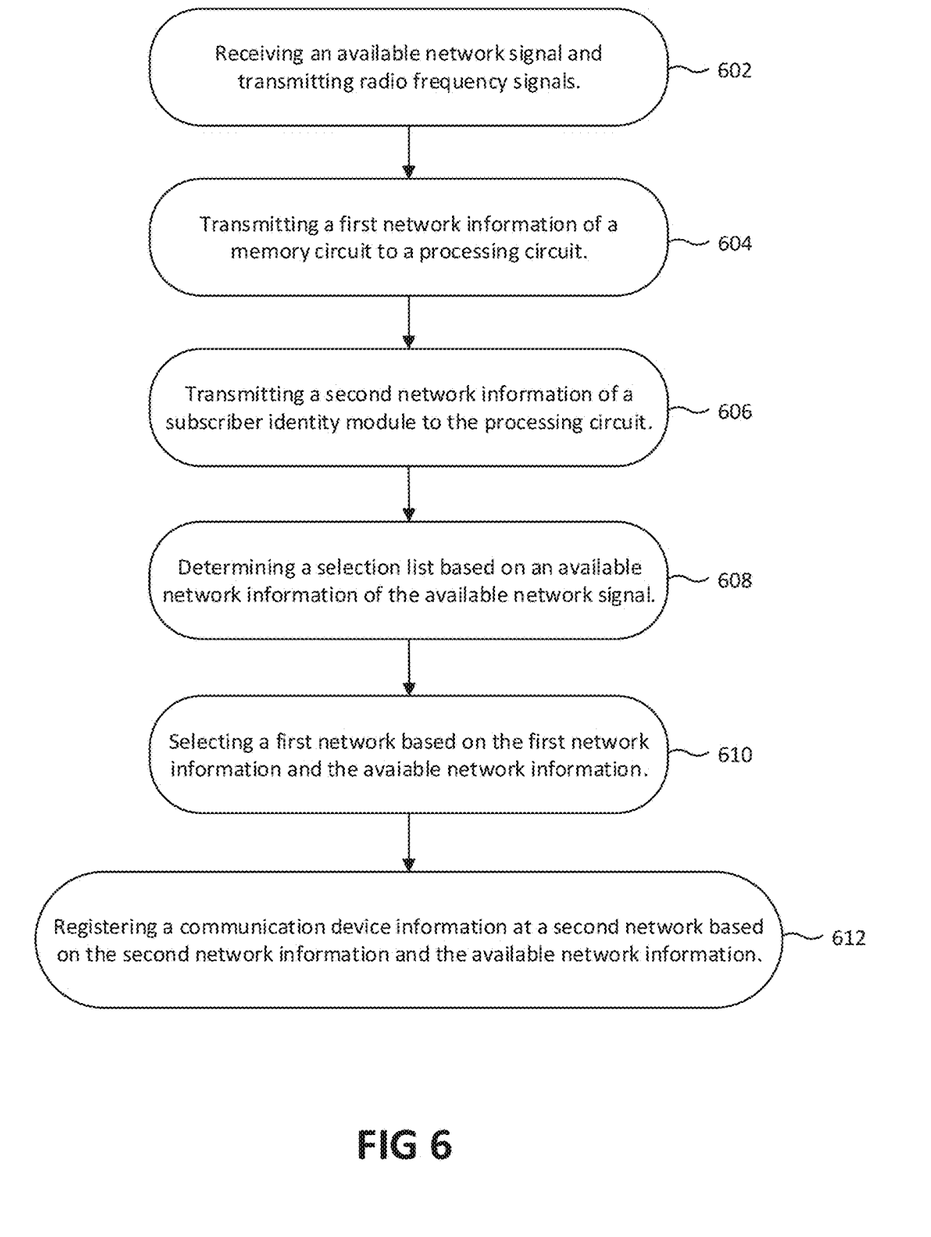
FIG. 6 shows a method for performing radio communication according to an example.

FIG. 6 shows a method for performing radio communication according to an example. The method may include, in 602, receiving an available network signal and transmitting radio frequency signals.

Further, the method may include, in 604, transmitting a first network information of a memory circuit to a processing circuit.

Moreover, the method may include, in 606, transmitting a second network information of a subscriber identity module to the processing circuit.

Further, the method may include, in 608, determining a selection list based on an available network information of the available network signal.

Moreover, the method may include, in 610, selecting a first network based on the first network information and the available network information.

Further, the method may include, in 612, registering a communication device information at a second network based on the second network information and the available network information.

It should be noted that aspects described in the context of the mobile wireless device according to the example of FIG. 1 to FIG. 4 are analogously valid for the methods that are illustrated based on FIG. 5 and FIG. 6.

In the following, various aspects of this disclosure will be illustrated:

Example 1 is a communication device that may include a radio frequency circuit configured to receive and transmit radio frequency signals, a processing circuit configured to process network information, a memory circuit configured to transmit a first network information to the processing circuit and a subscriber identity module configured to transmit a second network information to the processing circuit. The processing circuit may be configured to select a first network based on the first network information and to register a communication device information at a second network based on the second network information.

In Example 2, the subject matter of Example 1 can optionally include that the communication device may include a radio frequency circuit configured to receive an available network signal and to transmit radio frequency signals, a processing circuit configured to process network information, a memory circuit configured to transmit a first network information to the processing circuit and a subscriber identity module configured to transmit a second network information to the processing circuit. The processing circuit may be configured to determine a selection list based on an available network information of the available network signal, to select a first network based on the first network information and the available network information and to register a communication device information at a second network based on the second network information and the available network information.

In Example 3, the subject matter of any one of Examples 1 to 2 can optionally include that the memory circuit may be a non-volatile memory circuit.

In Example 4, the subject matter of any one of Examples 1 to 3 can optionally include that the memory circuit may be configured to transmit the first network information to the processing circuit in a connection initialization phase in which the processing circuit may be configured to establish a radio frequency connection.

In Example 5, the subject matter of any one of Examples 1 to 4 can optionally include that the processing circuit may be configured to verify if the second network information may be consistent with the first network information.

In Example 6, the subject matter of Example 5 can optionally include that the processing circuit may be configured to verify if the second network information is identical to the first network information.

In Example 7, the subject matter of any one of Examples 1 to 6 can optionally include that the processing circuit may be configured to verify if the second network information is consistent with the selection of the first network.

In Example 8, the subject matter of any one of Examples 5 to 7 can optionally include that the second network may be the first network if at least one of the second network information is consistent with the first network information or the second network information is consistent with the selection of the first network.

In Example 9, the subject matter of any one of Examples 5 to 7 can optionally include that the processing circuit may be configured to select the second network if at least one of the second network information is inconsistent with the first network information or the second network information is inconsistent with the first network.

In Example 10, the subject matter of Example 9 can optionally include that the second network may be different from the first network.

In Example 11, the subject matter of any one of Examples 1 to 10 can optionally include that the first network and the second network may be Public Land Mobile Networks based on a mobile radio communication technology.

In Example 12, the subject matter of any one of Examples 1 to 11 can optionally include that the first network information may be at least one of a group of network information of a mobile radio communication technology consisting of International Mobile Subscriber Identity, Card Type of the subscriber identity module, Acting Home Public Land Mobile Network, Broadcast Control Channels, Network Parameters, Access Control Class, Last Registered Public Land Mobile Network Selection Indication, Equivalent Home Public Land Mobile Network, Home Public Land Mobile Network Selector with Access Technology, Location Information, Packet Switched Location Information, Evolved Packet System Location Information and Equivalent Public Land Mobile Networks.

In Example 13, the subject matter of any one of Examples 1 to 12 can optionally include that the processing circuit may be configured to transmit a current network information to the memory circuit and the subscriber identity module.

In Example 14, the subject matter of Example 13 can optionally include that the processing circuit may be configured to transmit the current network information to the memory circuit and the subscriber identity module in a shutdown procedure of the communication device.

In Example 15, the subject matter of any one of Examples 1 to 14 can optionally include that the subscriber identity module may include a subscriber identity module card.

In Example 16, the subject matter of any one of Examples 1 to 15 can optionally include that the second network information may include at least one information of the subscriber identity module card.

In Example 17, the subject matter of any one of Examples 2 to 16 can optionally include that the available network signal may include a first broadcast signal of the first network and a second broadcast signal of the second network.

Example 18 is a method for performing radio communication. The method may include receiving and transmitting radio frequency signals, transmitting a first network information of a memory circuit to a processing circuit, transmitting a second network information of a subscriber identity module to the processing circuit, selecting a first network based on the first network information and registering a communication device information at a second network based on the second network information.

Example 19 is a method for performing radio communication. The method may include receiving an available network signal and transmitting radio frequency signals, transmitting a first network information of a memory circuit to a processing circuit, transmitting a second network information of a subscriber identity module to the processing circuit, determining a selection list based on an available network information of the available network signal, selecting a first network based on the first network information and the available network information and registering a communication device information at a second network based on the second network information and the available network information.

In Example 20, the subject matter of any one of Examples 18 to 19 can optionally include that the memory circuit may be a non-volatile memory circuit.

In Example 21, the subject matter of any one of Examples 18 to 20 can optionally include that the method may further include transmitting the first network information to the processing circuit in a connection initialization phase in which the processing circuit may be configured to establish a radio frequency connection.

In Example 22, the subject matter of any one of Examples 18 to 21 can optionally include that the method may further include verifying if the second network information may be consistent with the first network information.

In Example 23, the subject matter of Example 22 can optionally include that the method may further include verifying if the second network information may be identical to the first network information.

In Example 24, the subject matter of any one of Examples 18 to 23 can optionally include that the method may further include verifying if the second network information may be consistent with the selection of the first network.

In Example 25, the subject matter of any one of Examples 22 to 24 can optionally include that the method may further include the second network may be the first network if at least one of the second network information may be consistent with the first network information or the second network information may be consistent with the selection of the first network.

In Example 26, the subject matter of any one of Examples 22 to 24 can optionally include that the method may further include selecting the second network if at least one of the second network information is inconsistent with the first network information or the second network information is inconsistent with the first network.

In Example 27, the subject matter of Example 26 can optionally include that the method may further include the second network may be different from the first network.

In Example 28, the subject matter of any one of Examples 18 to 27 can optionally include that the method may further include the first network and the second network may be Public Land Mobile Networks based on a mobile radio communication technology.

In Example 29, the subject matter of any one of Examples 18 to 28 can optionally include that the method may further include the first network information may be at least one of a group of network information of a mobile radio communication technology consisting of International Mobile Subscriber Identity, Card Type of the subscriber identity module, Acting Home Public Land Mobile Network, Broadcast Control Channels, Network Parameters, Access Control Class, Last Registered Public Land Mobile Network Selection Indication, Equivalent Home Public Land Mobile Network, Home Public Land Mobile Network Selector with Access Technology, Location Information, Packet Switched Location Information, Evolved Packet System Location Information and Equivalent Public Land Mobile Networks.

In Example 30, the subject matter of any one of Examples 18 to 29 can optionally include that the method may further include transmitting a current network information to the memory circuit and the subscriber identity module.

In Example 31, the subject matter of Example 30 can optionally include that the method may further include transmitting the current network information to the memory circuit and the subscriber identity module in a shutdown procedure.

In Example 32, the subject matter of any one of Examples 18 to 31 can optionally include that the subscriber identity module may include a subscriber identity module card.

In Example 33, the subject matter of any one of Examples 18 to 32 can optionally include that the second network information may include at least one information of the subscriber identity module card.

In Example 34, the subject matter of any one of Examples 18 to 32 can optionally include that the method may further include the available network signal may include a first broadcast signal of the first network and a second broadcast signal of the second network.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
a radio frequency circuit configured to receive and transmit radio frequency signals;
a processing circuit configured to process network information;
a memory circuit configured to transmit a first network information to the processing circuit; and
a subscriber identity module configured to transmit a second network information to the processing circuit,
wherein the processing circuit is configured to select a first network based on the first network information and to register information associated with the communication device at a second network based on comparing the second network information to the first network information.

2. The communication device of claim 1,
wherein the memory circuit is a non-volatile memory circuit.

3. The communication device of claim 1,
wherein the memory circuit is configured to transmit the first network information to the processing circuit in a connection initialization phase in which the processing circuit is configured to establish a radio frequency connection.

4. The communication device of claim 1,
wherein the processing circuit is configured to verify if the second network information is consistent with the first network information.

5. The communication device of claim 4,
wherein the processing circuit is configured to verify if the second network information is identical to the first network information.

6. The communication device of claim 1,
wherein the processing circuit is configured to verify if the second network information is consistent with the selection of the first network.

7. The communication device of claim 4,
wherein the second network is the first network if at least one of the second network information is consistent with the first network information or the second network information is consistent with the selection of the first network.

8. The communication device of claim 4,
wherein the processing circuit is configured to select the second network if at least one of the second network information is inconsistent with the first network information or the second network information is inconsistent with the first network.

9. The communication device of claim 1,
wherein the first network and the second network are Public Land Mobile Networks based on a mobile radio communication technology.

10. The communication device of claim 1,
wherein the first network information is at least one of a group of network information of a mobile radio communication technology consisting of:
International Mobile Subscriber Identity;
Card Type of the subscriber identity module;
Acting Home Public Land Mobile Network;
Broadcast Control Channels;
Network Parameters;
Access Control Class;
Last Registered Public Land Mobile Network Selection Indication;
Equivalent Home Public Land Mobile Network;
Home Public Land Mobile Network Selector with Access Technology;
Location Information;
Packet Switched Location Information;
Evolved Packet System Location Information; and
Equivalent Public Land Mobile Networks.

11. The communication device of claim 1,
wherein the processing circuit is configured to transmit a current network information to the memory circuit and the subscriber identity module.

12. The communication device of claim 11,
wherein the processing circuit is configured to transmit the current network information to the memory circuit and the subscriber identity module in a shutdown procedure of the communication device.

13. A communication device, comprising:
a radio frequency circuit configured to receive an available network signal and to transmit radio frequency signals;
a processing circuit configured to process network information;
a memory circuit configured to transmit a first network information to the processing circuit; and
a subscriber identity module configured to transmit a second network information to the processing circuit,
wherein the processing circuit is configured to determine a selection list based on an available network information of the available network signal, to select a first network based on the first network information and the available network information and to register information associated with the communication device at a second network based on comparing the second network information to the first network information and the available network information.

14. The communication device of claim 13,
wherein the available network signal comprises a first broadcast signal of the first network and a second broadcast signal of the second network.

15. A method for performing radio communication, comprising:
receiving and transmitting radio frequency signals;
transmitting a first network information of a memory circuit to a processing circuit;

transmitting a second network information of a subscriber identity module to the processing circuit;
selecting a first network based on the first network information; and
registering information associated with the communication device at a second network based on comparing the second network information to the first network information.

16. The method of claim 15,
wherein the memory circuit is a non-volatile memory circuit.

17. The method of claim 15, further comprising:
transmitting the first network information to the processing circuit in a connection initialization phase in which the processing circuit is configured to establish a radio frequency connection.

18. The method of claim 15, further comprising:
verifying if the second network information is consistent with the first network information.

19. The method of claim 15, further comprising:
verifying if the second network information is consistent with the selection of the first network.

20. The method of claim 17,
wherein the second network is the first network if at least one of the second network information is consistent with the first network information or the second network information is consistent with the selection of the first network.

21. The method of claim 17, further comprising:
selecting the second network if at least one of the second network information is inconsistent with the first network information or the second network information is inconsistent with the first network.

22. The method of claim 15,
wherein the first network and the second network are Public Land Mobile Networks based on a mobile radio communication technology.

23. The method of claim 15,
wherein the first network information is at least one of a group of network information of a mobile radio communication technology consisting of:
International Mobile Subscriber Identity;
Card Type of the subscriber identity module;
Acting Home Public Land Mobile Network;
Broadcast Control Channels;
Network Parameters;
Access Control Class;
Last Registered Public Land Mobile Network Selection Indication;
Equivalent Home Public Land Mobile Network;
Home Public Land Mobile Network Selector with Access Technology;
Location Information;
Packet Switched Location Information;
Evolved Packet System Location Information; and
Equivalent Public Land Mobile Networks.

24. The method of claim 15, further comprising:
transmitting a current network information to the memory circuit and the subscriber identity module.

* * * * *